(12) United States Patent
Richards et al.

(10) Patent No.: US 9,758,692 B2
(45) Date of Patent: Sep. 12, 2017

(54) ARTICLE WITH REACTIVE METALS BOUND TO ITS SURFACE AND METHOD OF APPLICATION

(71) Applicants: Nicole Richards, Madison, NC (US); Thomas C. Kallish, Mount Kisco, NY (US)

(72) Inventors: Nicole Richards, Madison, NC (US); Thomas C. Kallish, Mount Kisco, NY (US)

(73) Assignee: Tommie Copper IP, Inc., Mt. Kisco, NY (US)

(*) Notice: Subject to any disclaimer, the term of this patent is extended or adjusted under 35 U.S.C. 154(b) by 48 days.

(21) Appl. No.: 14/808,611

(22) Filed: Jul. 24, 2015

(65) Prior Publication Data
US 2016/0024333 A1    Jan. 28, 2016

Related U.S. Application Data

(60) Provisional application No. 62/029,198, filed on Jul. 25, 2014.

(51) Int. Cl.
| | |
|---|---|
| *C08K 3/30* | (2006.01) |
| *C09D 133/14* | (2006.01) |
| *C08G 18/42* | (2006.01) |
| *C08G 18/69* | (2006.01) |
| *C08G 18/48* | (2006.01) |
| *C08K 5/3435* | (2006.01) |
| *C09D 175/04* | (2006.01) |
| *C09D 133/12* | (2006.01) |
| *D06N 3/00* | (2006.01) |
| *D06N 3/14* | (2006.01) |

(52) U.S. Cl.
CPC ....... *C09D 133/14* (2013.01); *C08G 18/4277* (2013.01); *C08G 18/48* (2013.01); *C08G 18/69* (2013.01); *C08K 3/30* (2013.01); *C08K 5/3435* (2013.01); *C09D 133/12* (2013.01); *C09D 175/04* (2013.01); *C08K 2003/3045* (2013.01); *D06N 3/0006* (2013.01); *D06N 3/14* (2013.01); *D06N 2203/068* (2013.01); *D06N 2209/1671* (2013.01)

(58) Field of Classification Search
CPC ..... C09D 175/04–175/16; C08L 75/04–75/16; D06M 15/564–15/579; D06M 2101/32; D06M 2101/34; D06M 2101/36; D06M 2101/38; D06M 2101/06; D06M 16/00; D06M 11/83; D06N 3/0063
USPC ....... 442/123–125, 152, 153, 168, 169, 222, 442/228, 229
See application file for complete search history.

(56) References Cited

U.S. PATENT DOCUMENTS

| | | | | |
|---|---|---|---|---|
| 3,856,464 A | * | 12/1974 | Dobinson | .......... C08G 18/3876 427/302 |
| 4,484,926 A | | 11/1984 | Atlas | |
| 4,968,734 A | | 11/1990 | Gaidis et al. | |
| 5,071,681 A | | 12/1991 | Manning et al. | |
| 5,505,999 A | | 4/1996 | Krishnan et al. | |
| 5,599,898 A | | 2/1997 | Hartmann et al. | |
| 5,747,392 A | * | 5/1998 | Xiao | .................... D06N 3/0059 442/124 |
| 6,093,422 A | | 7/2000 | Denkewicz, Jr. et al. | |
| 7,074,750 B2 | | 7/2006 | Hamers et al. | |
| 8,506,788 B2 | | 8/2013 | Wang et al. | |
| 8,741,197 B2 | | 6/2014 | Gabbay | |
| 2002/0022050 A1 | | 2/2002 | Anderson et al. | |
| 2004/0121113 A1 | * | 6/2004 | Mobley | ................ D06N 3/0052 428/85 |
| 2005/0124724 A1 | | 6/2005 | Burton et al. | |
| 2005/0256252 A1 | * | 11/2005 | Williams | ........... C08G 18/0823 524/507 |
| 2006/0027948 A1 | * | 2/2006 | Grass | ....................... B32B 5/08 264/257 |
| 2008/0152894 A1 | | 6/2008 | Beihoffer et al. | |
| 2010/0196487 A1 | | 8/2010 | Voss et al. | |
| 2011/0217348 A1 | * | 9/2011 | Karl | ....................... A01N 25/10 424/407 |

FOREIGN PATENT DOCUMENTS

| | | | | |
|---|---|---|---|---|
| GB | 1226806 A | * | 3/1971 | ............. C08G 18/08 |
| WO | WO 9746627 | * | 12/1997 | ............... C09D 4/02 |

OTHER PUBLICATIONS

Huntsman, Technical Bulletin D-2000, 2006.*
Szycher, M. Szycher's Handbook of Polyurethanes, First Edition, Apr. 23, 1999, CRC Press ISBN 9780849306020, p. 1-2.*
Huntsman, Jeffamine Polyetheramines, archived Jan. 21, 2013, https://web.archive.org/web/20130904011329/http://www.huntsman.com/portal/page/portal/performance_products/Media%20Library/global/files/jeffamine_polyetheramines.pdf.*

* cited by examiner

*Primary Examiner* — Frank Vineis
(74) *Attorney, Agent, or Firm* — St. Onge Steward Johnston & Reens LLC

(57) ABSTRACT

A polymeric carrier composition including a polymer synthesized from monomers selected from acrylic acids, methylacrylates and urethanes and at least one metal having an oxidation state of +1 or +2, including salts and coordination complexes thereof. The composition may be a suspension having 0.5 to 10% by weight of the polymer prepared from monomers selected from a group consisting of acrylic acids, methylacrylates and urethanes, and a viscosity less than 1,000 cps. The composition is applied to substrates, such as woven fabrics, to create metal-infused articles.

14 Claims, No Drawings

ARTICLE WITH REACTIVE METALS BOUND TO ITS SURFACE AND METHOD OF APPLICATION

FIELD OF THE INVENTION

Described herein are articles with reactive metals bound to their surface, a metal-containing polymer for application to articles, and a method of applying such reactive metals to their surface. The present process includes application of reactive metals to a variety of substrates that allows for time release of metal ions from the surface of the article. The invention is particularly useful when the substrate is woven, non-woven and knitted fabrics to which reactive zinc and copper is bound.

BACKGROUND OF THE INVENTION

There are many health related benefits believed to be associated with metals and metal ions. For example, zinc is known to be used in the treatment of acne, dandruff, and diaper rash; as well as a natural sunscreen. Silver is known for its antimicrobial properties. Copper has been used in medicine for many years for skin repair and regeneration. Copper increases oxygen transport, neutralizes free radicals, and inhibits growth of mold and mildew. For these reasons and others, there is a desire to incorporate metals into fabrics, finished garments, and other products.

In the field of applying metals to fabrics there are two main methods of doing so: extrusion and electroplating. Extrusion requires the metals be encapsulated within the fiber of the fabric. Typically, the metal is added to a slurry with the polymer of the fabric and an impregnated fiber is extruded (see, e.g., U.S. Pat. No. 8,741,197). This method limits the addition of the metal to the extruded fiber itself, and does not allow for treatment of woven or nonwoven textiles in their finished form. Further, fibers made from this method are sensitive to certain chemicals. For example, garments made from such products are degraded when exposed to fabric softeners.

It is further known that textiles may be plated with metals. Electroplating is known way to apply metals to fabrics. This process requires a conductive material on which to deposit metals. Electroless plating does not require an electric current, but is a more expensive option and is limited to autocatalytic reduction reactions, limiting the types of metals available for use.

It is desired to provide a method for applying metals in a reactive form, ions, complexes or salt forms, to the surface of a substrate.

It is desired to provide a method of applying reactive metals to the surface of articles such as textiles, foams, vulcanized or molded products, including fibers, woven and non-woven fabrics, and finished products such as garments and accessories without the use of electric current or excess chemicals.

It is further desired to provide a method of applying reactive metals to the substrate wherein the substrate retains its physical properties.

The present invention employs polymers containing reactive metals to achieve these objectives. Use of metal ions to cross-link polymer chains and encapsulating metal ions within a polymer has been taught in the art. Cross-linked polymers derived from acrylate, acrylate derivatives and the like are also well covered in the prior art.

For instance, U.S. Pat. No. 4,484,926 to Atlas discloses fibers made from cross-linked hygroscopic homopolymers with high moisture regain and antistatic properties. Suitable monomers for the homopolymers include acrylic acid and methyl acrylate. Atlas does not disclose copolymers.

U.S. Pat. No. 4,968,734 to Gaidis et al. discloses a copolymer compound composed of acrylic or methacrylic acid and hydroxyl alkyl ester of acrylic or methacrylic acid for use in concrete compositions to address flow and setting issues.

U.S. Pat. No. 5,071,681 to Manning et al. discloses a non-woven fabric having a web of cellulose fibers treated with a hydrophilic, absorbent polymer compound for enhancing water absorption capacity. The absorbent polymers can be homopolymers of acrylic or methacrylic acid or carboxylated polymers derived from acrylamide. The absorbent polymers may also be copolymers of acrylic or methacrylic acid, with one or more ethylenically unsaturated comonomers. The polymers are cross-linked after application to the fabric web using organic cross-linking agents such as polyglycidyl ether, di- and polyfunctional epoxide, or by complexing with metal ions having a valence greater than one and coordination greater than two (e.g., zinc, iron, and tin).

U.S. Pat. No. 5,505,999 to Krishnan et al. discloses a textile substrate coated with a polymer composed of unsaturated mono- or dicarboxylic ester monomer (e.g., methyl methacrylate) and an aliphatic conjugated diene monomer. The polymer may also contain an unsaturated mono- or dicarboxylic acid monomer (e.g., acrylic acid). The polymer can further include crosslinking agents and other additives to improve physical and mechanical properties.

U.S. Pat. No. 5,599,898 to Hartmann et al. discloses slightly swellable amino containing "popcorn" polymers which are suitable for removing metal ions (e.g., $Cu^{2+}$ and $Zn^{2+}$) from solutions. The polymers are made from monomers of vinylcarboxamides, monoethylenically unsaturated monomers (e.g., methyl acrylate, acrylic acid), and a compound with at least two ethylenically unsaturated double bonds as a crosslinking agent (e.g., ethylene glycol diacrylate, ethylene glycol dimethacrylate). There is no teaching of use or application of such "popcorn" polymers with textiles or fabrics.

U.S. Pat. No. 7,074,750 to Hamers et al. discloses cationically modified nanoparticles for the soil release treatment of textile surfaces. The nanoparticles are made of hydrophilic cross-linked polymers comprised of at least 60% carboxyl-containing ethylenically unsaturated monomers (e.g., acrylic acid and methacrylic acid), and a combination of water-insoluble monoethylenically unsaturated monomer (e.g., methyl acrylate), polyethylenically unsaturated monomer, sulfonic or phosphonic acid containing monomer, and/or water-soluble nonionic monomer. The nanoparticles are coated with cationic polymers, polyvalent metal ions or cationic surfactants. The cationic polyvalent metal ions disclosed include zinc and copper, although copper is noted as not being desired in all applications.

U.S. Pat. No. 8,506,788 to Wang et al. discloses leveler compounds for copper plating that are used manufacture semiconductors, circuit boards, etc. The leveler compounds have metal ions, electrolyte, and polymeric leveling agents made up of the following monomers: ethylenically unsaturated cross-linking agent, ethyleneically unsaturated nitrogen containing heterocyclic monomer and methacrylate monomer. The metal ions are preferably copper ions.

In spite of these efforts, all of the presently existing textile fibers used containing and releasing metal ions still suffer from several shortcomings. For instance, these fabrics are limited in color and may be clingy and staticy, depending on the textile used. Research in this area has shown that these shortcomings originate, at least in part, from the opacity of the metal coating solution.

Copper(II) oxide or cupric oxide (CuO) is the higher oxide of copper. It is a black solid with an ionic structure and can be an irritant. However, the risk of dermal sensitivity is considered extremely minimal. In comparison, Copper (I) oxide or cuprous oxide ($Cu_2O$) is typically a red-colored solid, though it can appear either yellow or red, depending on the size of the particles. When combined, the two ions result in copper-colored solutions. It is difficult to impart fabrics with various colors if including these species of copper because the reddish-copper color predominates.

Accordingly, it is desired to improve the opacity and color of metal containing solutions for imparting onto fabrics.

It is, therefore, an object of the present invention to provide metal-infused, light weight fabrics which may be woven, non-woven, or knitted and which can be used to prepare articles of apparel and home goods, which can be produced in a wide range of colors, are comfortable and can release ions on a time delay, all while being environmentally conscious and safe for human wear.

A further object of the invention is to provide a metal-containing polymer for coating or infusion with substrates of various types, in particular various types of fabric. It is an object of the invention that such polymer have sufficient water solubility and chemical reactivity, such that metal ions are released when the substrates come in contact with moisture.

It is another object of the invention that various colors of substrate are able to be manufactured containing a metal-infused polymer.

A still further object of the invention is to manufacture metal-containing fabrics that are inexpensive to manufacture and can be made using standard equipment in an environmentally conscious and safe manner.

It is the object of the present invention to provide a method for applying or delivering a reactive metal to the surface of a substrate by a carrier or vehicle. The present invention aims to improve upon the deficiencies of prior methods and techniques for incorporating reactive metals into fabrics, textiles, and other products.

Particularly, it is an object of the present invention to provide effective application of reactive metals, such as metal ions and reactive metal salts, to products especially in their finished form.

It is an object of the current invention that the metal ions and metal salts bound to the substrate are mobile so that they can be transported outside of the fabric or substrate.

It is a further object of the present invention to provide the time release of metal ions from the substrate to an external object.

SUMMARY OF THE INVENTION

The foregoing objectives have been met by provision of an article in accordance with the present invention that contains reactive metal complexes applied to its surface making metal ions available for transport to objects outside the fabric or substrate. The reactive metals are releasably bound to the article by a carrier or vehicle.

A method of making such an article in accordance with the present invention requires a substrate, the application of a carrier or vehicle carrying reactive metals to the substrate, and drying of the substrate.

In particular, one aspect of the present invention provides a polymeric carrier suspension comprising polymers synthesized from monomers selected from acrylic acids, methylacrylates and urethanes, and at least one metal having an oxidation state of +1 or +2, or salts and coordination complexes thereof, wherein the polymer is partially neutralized at the carboxyl ends. In certain embodiments, the polymer is a terapolymer. In other embodiments, the polymer is a copolymer.

In some embodiments, the metal comprises at least one of a zinc or copper compound. In some of these embodiments, the metal compound comprises at least one of copper (II) sulfate, zinc pyrithione, and copper sulfate pentahydrate. In certain of these embodiments, copper sulfate pentahydrate is present at 60% by weight of the composition. In certain embodiments, the zinc pyrithione is present in the composition at 1 to 5% by weight of the composition. In other embodiments, the metal comprises zinc 2-pyridinethiol-1-oxide. In certain of those embodiments, the metal further comprises copper sulfate.

In certain preferred embodiments of the polymeric carrier suspension, the metal compound comprises copper sulfate and zinc 2-pyridinethiol-1-oxide in a 2.45:3 ratio by molar of metal.

In certain embodiments of the polymeric carrier suspension, the suspension further comprises an oxyalkylene poly amino ether. In some of these embodiments, the oxyalkylene poly amino ether is synthesized from 3-amino-1-propanol-2-chlorotityl ether, and at least one of styrene isoprene and styrene butadiene.

In some preferred embodiments, the polymeric carrier suspension has a pH of 6.0 to 7.0, a viscosity of 50 to 300 centipoise, and/or a flashpoint greater than 94° C.

The polymeric carrier suspension is stable with respect to metal content at room temperature for up to 6 months, with preferred embodiments stable at room temperature up to 1 year. Further, the metal compound does not fall out of the polymeric carrier suspension when stored at room temperature for up to 6 months, and preferably, one year. In certain preferred embodiments, the color of the suspension does not change when stored at room temperature for up to 6 months. In certain of those embodiments, the color of the suspension does not change when stored at room temperature for up to one year.

In certain embodiments of the polymeric carrier suspension, the polymers are polymethyl methacrylate and/or polyhydroxypropylmethacrylate. In other embodiments, the polymers are synthesized from monomers such as urethanes. In some of those embodiments, the urethanes have prepolymers selected from the group consisting of hydroxyl-terminated polybutadienes (HTPB), hydroxy-terminated polyethers (HTPE), and hydroxy-terminated caprolactone ethers (HTCE). In certain of those embodiments, the urethane has HTPB prepolymers having an average molecular weight around 2,800 g/mol. In other embodiments where the monomer is a urethane, the urethane is comprised of hydroxy-terminated polyethers, which is a mixture of poly-1,4-butanediol and polyethylene glycol commonly referred to as TPEG.

In another particular aspect, the invention provides a polymeric carrier composition comprised of polymers synthesized from monomers selected from acrylic acids, methylacrylates and urethanes; and at least one metal compound having an oxidation state of +1 or +2, including salts and coordination complexes thereof. The composition may be a solid, solution, suspension or emulsion.

In preferred embodiments of the polymeric carrier composition, the metal compound is at least one of copper and zinc. In some of those embodiments, the metal compound comprises zinc and copper.

In certain embodiments, the monomers used to prepare the polymers of the polymeric composition are methyl methacrylate or hydroxypropylmethacrylate. In other embodiments, the monomers are urethanes. In certain embodiments where the monomers are urethanes, the monomers have prepolymers selected from the group consisting of hydroxyl-terminated polybutadienes and hydroxy-terminated polyethers. In other embodiments where the monomer is a urethane, the urethane has hydroxyl-terminated polybutadiene prepolymers having a molecular weight around 2,800 g/mol. In some preferred embodiments, the hydroxy-terminated polyethers comprises a mixture of poly-1,4-butanediol (poly-THF or Terathane) and polyethylene glycol (PEG), also referred to as TPEG.

In another particular aspect, the invention also provides a metal-infused article comprising a substrate with a finish applied to the substrate. The finish comprises a polymeric carrier composition comprised of a polymer synthesized from monomers selected from acrylic acids, methylacrylates and urethanes and at least one metal having a +1 or +2 oxidation state, wherein the metal is in an ionic or salt form.

In some preferred embodiments of the metal-infused article, the substrate is a knit or woven fabric. In certain of these preferred embodiments, the knit or woven fabric is comprised of at least one of cotton, wool, rayon, modal, tencel, polypropylene, nylon, polyester, spandex or any other elastomeric or cellulosic fiber. In certain of those embodiments, the fabric is comprised of polyester and blends thereof. In other embodiments, the substrate comprises nylon and blends thereof. In yet other embodiments, the fabric comprises cotton or another natural fiber, such as wool. In certain embodiments, the fabric has antimicrobial, antibacterial, antifungal, antistatic, ionic properties and a soft desirable hand.

In other embodiments of the metal-infused article, the substrate is a fiber. In certain of those embodiments, the fiber comprises at least one of cotton, wool, rayon, model, tencel, polypropylene, nylon, polyester, spandex or any other elastomeric or cellulosic material. In certain of those embodiments, the fiber is comprised of polyester and blends thereof. In other embodiments, the fiber comprises nylon and blends thereof. In yet other embodiments, the fiber comprises cotton or another natural fiber, such as wool. In preferred embodiments where the substrate is a fiber, the fiber has antimicrobial, antibacterial, antifungal, antistatic, ionic properties and a soft desirable hand.

In some embodiments of the metal-infused article, the substrate is a yarn. In certain of those embodiments, the fiber comprises at least one of cotton, wool, rayon, model, tencel, polypropylene, nylon, polyester, spandex or any other elastomeric or cellulosic material.

In certain embodiments of the metal-infused article, the substrate is non-woven. In some of those embodiments, the substrate is comprised of at least one of cotton, wool, rayon, model, tencel, polypropylene, nylon, polyester, spandex or any other elastomeric or cellulosic material.

In some embodiments, the finish of the metal-infused article further comprises at least one of a surfactant, a dispersing agent and a viscosity modifier. In some of those embodiments, the viscosity modifier is selected from the group consisting of oxyalkylene poly amino ethers. Preferred oxyalkylene poly amino ethers are synthesized from 3-amino-1-propanol-2-chlorotityl ether and styrene isoprene and/or styrene butadiene.

In certain preferred embodiments, the finish is applied to the substrate at 2 to 20% by weight.

The invention further provides a method of manufacturing a metal-infused textile through a dye-bath method. The method comprises the steps of providing a textile substrate, scouring or bleaching the textile, filling a dye bath with a finish comprising a polymeric carrier composition comprised of polymers synthesized monomers selected from acrylic acids, methylacrylates and urethanes and at least one metal having a +1 or +2 oxidation state, said metal including coordination complexes and salts thereof, heating the finish to a temperature of 115 to 125° C., adjusting pH of the finish to around 4.0, dipping the substrate into the finish, removing excess finish, and drying the metal-infused substrate.

In some embodiments of the inventive method of manufacturing a metal-infused textile, the textile has been pre-treated in a bath having a pH of 4.0 to 8.0 before it is further placed into a dye bath. In certain of those embodiments the pH is 5.0 to 7.0, more preferably below 7.5, most preferably around 6.0.

In certain embodiments, the method of manufacturing comprises applying a finish that comprises 2 to 20% by weight of the polymeric carrier before adjusting for wet pick up. In certain of these embodiments, the finish comprises 2.5 to 10% by weight of the polymeric carrier before adjusting for wet pickup. In certain of these embodiments, the finish comprises 5 to 7% by weight of the polymeric carrier before adjusting for wet pickup.

In certain embodiments of the method, the finish further comprises softener. In some of those embodiments, the softener comprises 3.0% by weight of the article before adjusting for wet pick up.

In some embodiments of the method, the finish applied to the metal-infused article further comprises magnesium sulfate. In certain of those embodiments, the magnesium sulfate is present at 10 to 40% by weight of the article before adjusting for wet pick up.

The invention further provides another method of manufacturing a metal-infused textile using a pad trough. This alternative method comprises the steps of placing a finish comprised of a polymeric carrier composition comprised of a polymer synthesized from monomers selected from acrylic acids, methylacrylates and urethanes and at least one metal having a +1 or +2 oxidation state, said metal including coordination complexes and salts thereof into a pad trough, adjusting pH of the finish to 5.5 to 7.0, placing a textile substrate into the pad trough, padding the finish onto the textile substrate, removing excess finish, and drying the metal-infused textile. In certain embodiments of the padding method, the method further comprises the step of stirring the finish for a minimum of 2 hours before placing the finish into the bath.

In some embodiments of the padding method of manufacturing a metal-infused textile, the textile has been pre-treated in a bath having a pH below 7.5 before it is further placed into the pad trough. In some embodiments, the textile is dry before it is placed into the pad trough.

In certain embodiments of the padding method, the temperature of the finish is below 40° C. In some embodiments, the frame temperature does not exceed 150° C.

In preferred embodiments of the padding method, the finish comprises about 5.0% by weight of the polymeric carrier before adjusting for wet pick up.

In some embodiments of the inventive methods, the finish further comprises a dye. In certain embodiments, the finish further comprises a softener. In some embodiments where the finish comprises softener, the softener is about 1.0% by weight of the finish before adjusting for wet pick up.

In some embodiments of the inventive methods, the finish further comprises compatibilizer. In some of those embodiments, the compatibilizer is about 0.5% by weight before adjusting for wet pick up.

In certain embodiments of the inventive methods, the pH is adjusted with acetic acid or sodium bicarbonate.

These and other aspects of the present invention will become apparent from the following description.

DETAILED DESCRIPTION OF THE INVENTION

A process for imparting reactive metal ions or metal salts to articles and the articles produced by such process are provided. An article having reactive metals bound to its surface made up of a substrate and a finish applied to the substrate is described herein. The finish is comprised of a polar, polymeric carrier or vehicle for transporting reactive metals in their ionic or salt form. The reactive metals are transition metals in a complex form with an oxidation state of +1 or +2 and metal ions are transportable away from the surface of the finished article.

The article and methods of making the same described herein may be comprised of or suitable for use with a variety of substrates. Further, the process described herein is suitable for treating yarns or fibers as well as woven or non-woven fabrics, dyed garments, fabric components, vulcanized rubber products, products made by injection molding, and other products. As used herein, the term "fabric" includes not only the planar textile structure produced by interlacing yarns, fibers or filaments, including woven, non-woven and knitted fabrics, but also the yarns, fibers or filaments themselves.

The term "substrate" as used herein includes products, product components, textiles and textile components made from natural and synthetic materials. The substrate could include yarns, fibers, fabric, garments, hats, socks, linens, footwear, and insoles, among other substrates. Preferred substrates are further described below.

"Polymer" and "polymeric" refer to polymers and oligomers and include homopolymers and copolymers. "Homopolymer" refers to polymers formed from a single type of monomer. "Copolymer" refers to a polymer made from two or more different monomers. Linear polymers consist of a single main chain whereas branched polymers consist of a single main chain with one or more side chains. A terpolymer is traditionally known as a copolymer consisting of three different monomers. As used herein, "terapolymer" or "terapolymeric" refers to a polymer consisting of three monomers in which the three monomers are all the same component. The terapolymers of the present invention can also be considered as homotrimeric.

The terms "oligomer" and "oligomeric" refer to dimers, trimers, tetramers and the like. "Monomer" refers to any ethyleneically or acetyleneically unsaturated compound capable of being polymerized. Such monomers may contain one or more double or triple bonds. Monomers containing two or more double or triple bonds capable of being polymerized are referred to as "cross-linking agents." The terms "cross-linking agent" and "cross-linker" are used interchangeably.

The term "wet pick up" as used herein refers to the amount of a dye or composition that is applied to a substrate by weight of substrate.

The polymeric carriers of the present invention can be present as a solution, suspension, solid or emulsion. In preferred embodiments the carrier exists as a suspension that is capable of being applied to a substrate. The carrier is preferably cured after application to a substrate, after which it often exists on or intermingled with the substrate in a solid or semi-solid state. Curing refers to the toughening or hardening of the polymer material by cross-linking of polymer chains. Curing can be brought about by heat, chemical additives, absorption, adsorption, ultraviolet radiation, electron beams or other processes known in the art. The polymers of the present invention are preferably moisture or heat cured, or through the use of both.

The invention employs the use polymeric, preferably, terapolymeric or copolymeric, carriers. The carrier is comprised of polymers synthesized from monomers selected from acrylic acids, methylacrylates and urethanes and at least one metal having an oxidation state of +1 or +2, or salts and coordination complexes thereof.

Generally, monomers having from 2 to 150 carbon atoms, preferably from 10 to 50 carbon atoms, most preferably 14 to 30 carbon atoms, can be used. Monomers useful in the present invention may be linear, block or graft homopolymers or copolymers. Such monomers typically have a degree of polymerization of from about 1 to about 50, and preferably from about 2 to about 50.

Examples of these monomers include acrylic acid, 2-bromoacrylic acid, 2-(bromomethyl)acrylic acid, 2-ethylacrylic acid, Hafnium carboxyethyl acrylate, methacrylic acid, 2-propylacrylic acid, sodium acrylate, sodium methacrylate, 2-(trifluoromethyl)acrylic acid, and the like. Of these, acrylic acid and methacrylic acid are preferred. Polyacrylic acids having molecular weights around 1,250 g/mol and more are commercially available and are particularly preferred for use in the present invention. An average molecular weight of approximately 2,800 g/mol is particularly preferred in certain embodiments.

The term "(meth)acrylic" includes both acrylic and methacrylic and the term "(meth)acrylate" includes both acrylate and methacrylate. Likewise, the term "(meth)acrylamide" refers to both acrylamide and methacrylamide. As used herein, the term "(meth)acrylate monomer" includes all types of (meth)acrylic, (meth)acrylate and (meth)acrylamide monomers.

As examples, suitable methacrylates include methacrylates or hydroxypropylmethacrylate. Suitable alkyl(meth)acrylates include without limitation ($C_1$-$C_{24}$)alkyl(meth)acrylates. Examples of alkyl(meth)acrylates include, but are not limited to: methyl methacrylate, methyl acrylate, ethyl acrylate, propyl methacrylate, butyl methacrylate, butyl acrylate, isobutyl methacrylate, hexyl methacrylate, cyclohexyl methacrylate, cyclohexyl acrylate, 2-ethylhexyl acrylate, 2-ethylhexyl methacrylate, isodecyl methacrylate, and mixtures thereof. Especially preferred methacrylates are methyl methacrylate or hydroxypropylmethacrylate.

Also preferred are monomers comprised of urethanes. For purposes of the present invention, polyurethane refers to a polymer composed of a chain of organic units joined by carbamate (urethane) links. The organic units are referred to herein as prepolymers. Prepolymers of the present invention are composed of a variety of polyol and isocyante reactants at a stoichiometry to achieve a "% free NCO," typically between 3-25%. "NCO" refers to isocyanate group. The polyol component may be polyether, polyester, polybutadiene, or natural oil based polyol. The isocyanate may be selected from the entire range of conventional chemistries, including toluene diisocyante (TDI), various isomers of pure diphenylmethan-4,4'-diisocyante (MDI), polymeric MDI, and aliphatic types.

Choices for urethane binders and their properties depend on various needs, and in particular, are dictated by the choice of substrate to which the carrier is applied. For instance, modifications as described herein are made to adhere the metal onto fabric.

A preferred binder is HTPB. HTPB is formed from free radical polymerization of 1,3-butadiene, which leads to some branching and formation of a polymer with a hydroxyl functionality of approximately 2.2-2.4. It can therefore be used with a range of di- or multi-functional isocyanates, which are often combined with isophorone diisocyanate (IPDI), using dioctyl adipate (DOA) as a plasticizer.

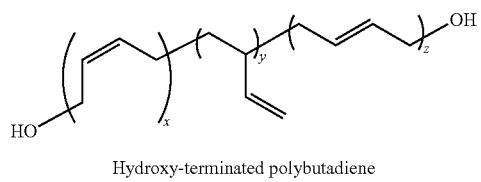

Hydroxy-terminated polybutadiene

An HTPB polymer that is commonly used in the present invention has three commercially available forms, all having an average molecular weight of approximately 2,800 g/mol. R-45M is a high-quality military grade polymer which is made by a batch process; R-45HT can be employed in most systems and is within the HTPB Type II limits specified for formulations such as PBXN-109, a type of plastic typically used in explosives. R-45HT has a higher viscosity and hydroxyl functionality than R-45M. Another system, R-45HTLO, has a slightly lower hydroxyl value. Compared to R-45HT, R-45HTLO has been found to increase the curing rate of formulations, leading to a decrease in the required catalyst levels. An increase in hardness has also been observed, possibly due to a higher level of cross-linking. All three forms may be combined for application to metal-infused articles of the present invention.

Another preferred binder is HTPE. HTPE can be used to form carrier compositions of the present invention that exist as a mixture of poly-1,4-butanediol (poly-THF or Terathane) and polyethylene glycol (PEG), also referred to as TPEG. TPEG is difunctional and reaction with a difunctional isocyanate does not lead to cross-linking. For this reason, it is often used with Desmodur N-100, an isocyanate mix containing the multifunctional biuret of hexamethylene diisocyanate (HDI). HTPE can be used in formulations containing energetic plasticizers, whereas HTPB is immiscible with such plasticizers. Combined with the higher density of HTPE, this allows higher energy formulations to be created.

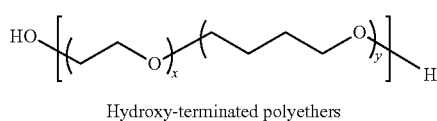

Hydroxy-terminated polyethers

An alternative binder that may be employed in the present invention is hydroxy-terminated caprolactone ethers (HTCE), also known as polycaprolactones (PCL) or polycaprolactone polyols (PCP). The advantages of using HTCE are its low cost and commercial availability and that it can be used in formulations containing energetic plasticizers. Dow has a wide range of polycaprolactones, to suit many applications, marketed as TONE™ polyols, while Solvay has an extensive selection under the CAPA® trademark. Energetic binder systems containing nitrated prepolymers, such as polyGLYN (poly(glycidyl nitrate)) or polyNIMMO (poly(3-nitratomethyl-3-methyloxetane)), can be used to enhance performance over formulations containing inert polymers.

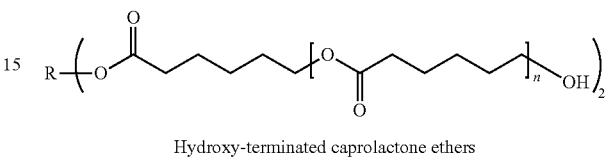

Hydroxy-terminated caprolactone ethers

An exemplary prepolymer of polypropylene glycol polyether diol and MDI will have a viscosity of 1,000-2,000 cps at a free NCO in the 8-10% range. However, since many particulate bonding processes rely on mixing the particles with a moisture-cure binder at ambient temperature and humidity using relatively low-shear mixing equipment, binder viscosities over 1,000 cps are problematic for uniform incorporation into the mix. A resolution to this problem is to incorporate a non-reactive hydrocarbon diluent into the formulation at levels ranging from 10% to (in some cases) over 30%. Hydrocarbons of choice are typically naphthenic and aromatic process oils, which are relatively inexpensive and exhibit fairly high compatibility with the prepolymer, along with good viscosity depression characteristics.

As used herein, the terms "percent", "%," "weight percent" and "wt %" all mean the percentage by weight of the indicated component or ingredient within the product or composition in which it is present, without dilution, unless otherwise indicated by the context in which the term is used.

The polymeric material is prepared from about 0.5 to 10 weight percent of acrylic or methacrylic acid and from 0.5 to 10 weight percent of urethanes. More particularly, the polymeric material is made from about 1 to 8 percent of acrylic or methacrylic acid or urethanes. Most preferably, polymeric material is made from about 7 to 8 percent of acrylic or methacrylic acid or urethanes. Preferably the polymer has an average molecular weight of 85 to 130 g/mol, more preferably 88 to 112 g/mol, most preferably 88 to 100 g/mol. The polymer can be around 90 g/mol average molecular weight for urethane and around 86 g/mol average molecular weight for methyl acrylate. In certain preferred embodiments, the polymer has an average molecular weight of 95 g/mol. In certain other preferred embodiments the polymer has an average molecular weight up to 112 g/mol for urethane.

Typical sources of metal ions are any metal compounds that are soluble in water or aqueous based organic solvent systems. Suitable metal compounds include, but are not limited to, inorganic and organic metal salts such as metal sulfate, copper persulfate, metal halide, metal chlorate, metal perchlorate, metal alkanesulfonate such as metal methanesulfonate, metal alkanol sulfonate, metal arylsulfonate, metal fluoroborate, metal nitrate, metal acetate, metal citrate and metal gluconate. Exemplary metals include, without limitation, copper, tin, silver, gold, bismuth, nickel, zinc, iridium and antimony. In one embodiment, the source of metal ions is a source of copper ions. In a further embodiment, the source of metal ions is copper sulfate.

Mixtures of metal compounds containing the same metal or different metals may be used. Exemplary mixtures of metals include, but are not limited to, copper-tin, copper-tin-bismuth, copper-zinc, tin-bismuth, tin-copper-silver, tin-silver, and copper-silver. Such sources of metal ions are generally commercially available.

Suitable metal salts and metal complexation agents are, for example, the water-soluble salts of Ca, Mg, Ba, Al, Zn, Fe, Cr, Cu, Ni, Co and Mn or mixtures thereof. Examples of water-soluble metal salts are calcium chloride, calcium acetate, magnesium chloride, aluminum sulfate, aluminum chloride, barium chloride, zinc chloride, zinc sulfate, zinc acetate, zinc pyrithione, zinc 2-pyridinethiol-1-oxide, iron (II) sulfate, iron(III) chloride, chromium(III) sulfate, copper sulfate, copper sulfate pentahydrate, nickel sulfate, cobalt sulfate and manganese sulfate. Preference is given to using the water-soluble salts of Cu and Zn. Preferred salts and complexation agents include copper (II) sulfate, zinc pyrithione, copper sulfate pentahydrate, zinc amidine, and zinc 2-pyridinethiol-1-oxide.

The metal may be present in the carrier composition from 40% to 80% by weight in total. More preferably, the metal, such as a copper (II) salt or complex, may be present in the carrier composition from 50% to 70% by weight. Even more preferably the copper (II) salt or complex is present in the carrier composition at about 60% by weight. For a zinc compound, it may be present in the carrier composition from 0.5% to 10% by weight; more preferably, 1% to 5% by weight.

In particularly preferred embodiments, copper is present from 50% to 70% by weight, most preferably 60% by weight as copper sulfate or copper sulfate pentahydrate. In other particularly preferred embodiments, zinc is present at 1% to 5% by weight as zinc pyrithione, zinc amandine or zinc 2-pyridinethiol-1-oxide. In certain particularly preferred embodiments, copper or a salt thereof is present at about 55% to 65% by weight in combination with zinc or a salt or coordination complex thereof at 1-5% by weight. In another particularly preferred embodiment, both copper and zinc are present in a 2.45:3 ratio. In certain of these embodiments, the 2.45:3 ratio is calculated based on the metal being provided as copper sulfate or copper sulfate pentahydrate and pyrithione or zinc 2-pyridinethiol-1-oxide salts.

Additional ingredients may also be included in the polymeric systems to improve mechanical properties, assist in curing and increase the stability of other components and/or the product. These include bonding agents, wetting agents, cross-linkers, plasticizers, viscosity modifiers, antioxidants, stabilizers, pH adjusting agents and catalysts.

The mechanical properties of the binder are altered by the addition of a plasticizer, which imparts the rubbery characteristic that is required for intrinsic modulus ("IM"), reduces the viscosity for ease of casting and enables higher solids loading. Plasticizers are also used to alter the glass transition temperature, the temperature at which the binder changes from rubbery to brittle. All of these properties can be varied with plasticizer selection. Dioctyl adipate (DOA) is a commonly used plasticizer, providing a good balance of desired properties. Other plasticizers include isodecyl pelargonate (IDP), dioctyl secabate and a range of phthalates. Energetic plasticizers such as Nbutylnitratoethylnitramine (butyl-NENA) can be added to improve performance over conventional plasticizers. Mechanical properties can also be optimized by altering the physical or chemical interactions between the components in a formulation.

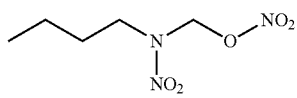

N-butylnitratoethylnitramine

Viscosity modifiers may be selected from the group consisting of oxyalkylene poly amino ethers. Preferred oxyalkylene polyamino ethers include 3-amino-1-propanol-2-chlorotityl ether, styrene isoprene, and styrene butadiene. It is preferable that the viscosity of the carrier composition in an emulsion or suspension is less than 1,000 cps. More preferably, the viscosity is less than 500 cps. In particularly preferred embodiments, the viscosity of a carrier suspension is 150 to 250 centipoise. Most preferably, the viscosity of a carrier suspension of the present invention has a final viscosity around 200 centipoise, as measured by any known viscosity measuring method, such as the methods described in Website_Viscosity_Units_V2.pdf available on the hydra-motion.com website.

Bonding agents, such as Dantocol DHE, are used to enhance interface strength between the binder and solids by adsorbing onto the filler and forming chemical bonds with the binder. The major component of DHE is N,N-di(2-hydroxyethyl)dimethyl hydantoin, which forms chemical bonds with the isocyanate through its hydroxyl groups and interacts with nitramines such as RDX and HMX via the amide groups.

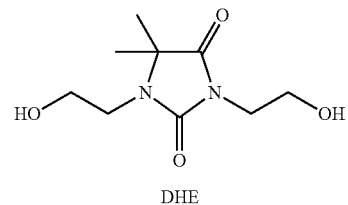

DHE

Cross-linkers, e.g. trimethylolpropane, a trifunctional alcohol, form additional chemical bonds within the polyurethane system and improve mechanical properties. The curing rate of polyurethanes is largely dependent upon the isocyanate used and is often too slow for our applications. Formulations that include isocyanates that cure relatively slowly, e.g. IPDI, incorporate catalysts to increase the rate of curing. Triphenylbismuth (TPB) and dibutyltin dilaurate (DBTDL) are two catalysts that are commonly used. This is likely due to the activation of the hydroxyl groups, with the effect increasing over time. The quality of the ingredients and the stability of the final product in regards to safety are very important.

Antioxidants may also be added to inhibit oxidation of the binder, which causes extra cross-linking and hardening and may form a brittle product with possibly lower IM properties, i.e., brittle. Some formulations, particularly nitrate esters, contain stabilizers, e.g. ethyl centralite, to increase shelf life. ButylNENA contains 0-1% N-methyl-4-nitroaniline (MNA) to scavenge free radicals that may catalyze a reaction or decomposition. HTPE also contains a stabilizer, 2,6-di-tertbutyl-4-methylphenol (butylated hydroxytoluene, BHT), in small amounts (0.05-0.2%). All of the binder ingredients are mixed to give a product with the desired stability and mechanicals properties in the cured product.

Carrier compositions of the present invention may be aided by inclusion of a pH adjusting agent. Polymeric carriers of the present invention have pH of 4.0 to 8.0. It is preferred that the carrier composition is formed as a suspension having a neutral pH, such as 5.0 to 7.5. In certain preferred embodiments, the carrier is present in a suspension having a pH of 5.0 to 7.0. Most preferably, the pH of a carrier suspension is made to a target pH of 6.0.

Wetting agents, such as Invadine® and Albaflow® (Huntsman Chemicals) may be included in the carrier and/or uses to pretreat a textile substrate.

The polymers described herein may be formed by solution polymerization utilizing conventional free radical initiators. The solvent must be a solvent for each of the monomeric reactants but need not be a solvent for the resultant polymer. Other conventional polymerization techniques, such as bulk polymerization, may be used to produce the subject polymer.

Examples of suitable solvents for the polymer carrier composition include ethanolamines and the like as well as other organic liquids which are capable of solvating the components in the polymer carrier composition. Of these, monoethanolamine is particularly preferred. Water can also be used.

The present inventors have commonly produced a stable polyurethane polymer emulsion by making the prepolymer and reacting all the residual isocyanate functionality with a species such as dimethylol propionic acid, followed by neutralization of the carboxylic acid functionality and emulsification in water. This process produces stable polyurethane emulsions of many useful polymers that can form films through water evaporation, exhibit excellent adhesion, and can be cross-linked through the residual carboxylic acid functionality. However, the process is relatively expensive and the resulting polyurethane polymer does not retain isocyanate functionality.

Another method that can be employed to impart water solubility to isocyanate-containing species is to react a portion of the isocyanate functionality with a water-soluble species, such as a polyethylene oxide monol or polyol. This results in an isocyanate species that is readily soluble in water yet retains some reactive isocyanate functionality. These soluble isocyanates can be added directly to other water-based polymers to impart adhesion, crosslinking or other attributes.

Extending moisture-cure polyurethane binders with water may be accomplished through the formation of water emulsions of the reactive prepolymer component immediately before use in the final product or process. The initial step is to determine the necessary properties of the quasi-prepolymer and to choose the appropriate polyol, isocyanate, and stoichiometry to achieve the target composite characteristics. If a formulation incorporating a hydrocarbon diluent is used, a convenient starting point is to simply make the prepolymer without the hydrocarbon diluent. This product is typically a high-viscosity fluid.

The second step is to choose an appropriate emulsifying agent and level. This involves making a series of water solutions of surfactants at varying concentrations. The third step is to mix the two components (the prepolymer and the surfactant water solution) under conditions of shear simulating the machinery to be used in the formation of the in-situ emulsion. The emulsions are then evaluated for stability and reaction rate and the surfactant and prepolymer components adjusted accordingly.

The process of water emulsification of a reactive isocyanate prepolymer is counterintuitive, since the emulsion produced is, of necessity, a very unstable material. By judicious choice of the emulsifying agent and level (as well as the prepolymer components), however, emulsions can be formed that are suitably stable for their application and use. In actual use, due to the extremely low viscosity of the emulsions formed, they can be incorporated much more rapidly than hydrocarbon-extended binders in a variety of particulate mixtures, thereby improving the efficiency of the mixing and moisture-curing process.

The total monomer concentration should be between 10 and 40 (preferably from 25-40) weight percent based on the total weight of the initial solution. The specific concentration depends on the solubility relationship of a particular solvent, monomer and copolymer combination. The polymerization reaction can be conducted at various temperatures of from ambient to about the boiling temperature of the solutions. Lower temperatures may be used with temperatures of from 40°-80° C. being preferred. The reaction can be run under atmospheric pressure although sub or superatmospheric pressure may be used. The most preferred polymerization conditions are the use of a 30 weight percent monomer in dioxane run at 60° C.

The polymerization is initiated using small amounts of (e.g. 0.1 to 1.5 mole percent) a conventional free radical polymerization initiator such as azobisisobutyronitrile or the like. In addition, other conventional free radical polymerization components such as chain transfer agents (butanethiol, etc.) and the like can be used to control molecular weight of the polymer. The specific amounts required can be readily determined by conventional methods.

The resultant polymer solution can be treated with a material capable of precipitating the polymer from solution. This material is, preferably, also a solvent for residual monomer. Examples include non-cyclic ethers, such as diethyl ether, chlorinated hydrocarbon, such as chloroform and the like. The precipitated polymer may be taken up in aqueous solution by neutralization with an alkali or alkaline earth metal hydroxide, preferably sodium hydroxide, to form the water soluble copolymer product of the present invention.

It is most preferable if the polymeric carrier composition is manufactured as an emulsion, solution or suspension having a flashpoint above 94° C.

The polymeric carriers are applied to various substrates comprised of different materials. In preferred embodiments, the substrate is a fabric. When the substrate is a fabric, it can be a knit, such as circular knits, warp knits (Tricot and Raschel), sliver or high pile knit. The substrate can alternatively be comprised of wovens, and non-wovens.

In some embodiments the fabric may be composed of fibers. In accordance with the invention, any of these fibers may be assembled or fabricated into various types of fabrics including those involving interlocked yarns or threads formed of plied yarns and those of felt-like character in which the fibers or filaments are interlaced or interlocked with or without being adhesively bonded at their points of intersection or interlocking. The former type of fabric may be a woven, knitted, netted, knotted, or braided fabric formed of yarns comprising fibers or filaments of the type specified.

Non-woven fabrics contemplated by the present invention are also obtainable by the haphazard distribution of a multiplicity of fibers either of short lengths or of continuous length. This includes such fabrics as are obtained by carding, and if desired, superimposing a plurality of carded webs upon one another with the machine direction of the various webs disposed either parallel to one another or at various angles for the purpose of providing either anisotropy or isotropy in the characteristics of the resulting fabric, particularly as to strength and cleavage. Intermediate forms, which may also be termed hybrid forms, of fabrics may be involved such as the type of fabric known as needle felts wherein a woven or knitted fabric has fibers or filaments punched through the woven base fabric.

The various fabrics may be formed entirely of fibers, filaments, and yarns of the type defined above, but preferably, they comprise a blend of fibers or filaments of this type with fibers or filaments of other types, either natural or artificial in origin. Similarly, the fabrics may be formed of a mixture of yarns comprising fibers or filaments of the type defined above with yarns formed of other fibers, either natural or artificial. Thus, the fabrics may also comprise fibers, filaments, or yarns of cotton, wool, silk, linen, nylon, polyethylene terephthalate (e.g. Dacron), regenerated cellulose rayons, cellulose acetate, casein, vinyl resin fibers, such as copolymers of vinyl chloride and vinyl acetate or acrylonitrile, and especially polyesters, polyacrylonitriles, polyamides and polyurethanes and copolymers thereof. The proportion of fibers, filaments, or yarns. Preferred fabrics are comprised of at least one of cotton, nylon, polyester, and spandex, or any other elastomeric fiber, such as rubber or PPU. Particularly preferred fabrics are comprised of blends of cotton, nylon, polyester, and spandex.

Where the substrate is a woven fabric comprised of blends of cotton, nylon, polyester, and spandex, it may be for example, comprised of nylon, nylon/spandex, such as nylon/Lycra®, polyester, or polyester/spandex. Where the substrate is comprised of blends, such as nylon/spandex, or polyester/spandex, the blends can have different levels of each component. For instance, in preferred embodiments, the carrier has been applied to nylon/spandex 84/16, 85/15, 86/14, 68/32, and polyester/spandex 92/8, 95/5, 88/12, 84/16, 86/14, and 93/7. Blends having up to 20% spandex yarns per square meter or square yard or by weight are preferred. The invention, however, is not limited to any particular blend or ratio of components and is dependent on the type of article being produced. The invention is specifically meant to include 100% cotton and silk or other natural fibers, and various blends thereof including, but not limited to, those with rubber. Non-limiting examples of cotton blends to which the polymeric carrier has been and may be applied include cotton/spandex where the spandex is present at up to 20% yarns by square meter or square yard or by weight.

The invention is unique in that it can be applied to cotton and other natural or natural-based fibers, such as wool, tencel, silk, rayon, etc. To the inventors' knowledge, it is heretofore unknown to apply a metal containing polymer to a natural fabric, and particularly, cotton. Due to the limitations in the art, metal ions have heretofore only been able to be incorporated into synthetic fabrics where they were incorporated during the manufacture, e.g. extrudation, spinning, of the synthetic fiber or, possibly, through electroplating, which is cumbersome and expensive. To the best of applicant's knowledge, the art has not applied a metal containing polymer to a natural fiber after it has already been woven into its final form, such as a yarn or woven or knitted article comprised of yarns, fibers, etc., other than possibly by cumbersome and costly electroplating methods. The ability of the invention to incorporate metal ions to a finished product saves substantial time and costs and lowers environmental impact. It also imparts a superior comfort level and feel in particular textiles and applications, such as for use in home goods, such as sheets and blankets, or for certain types of garments.

The metal-containing polymeric carriers of the present invention can also be applied or incorporated into to other types of articles. For instance, plastic articles can be prepared by means of incorporating (e.g., by means of compounding) the carrier and/or dyes directly into the polymeric materials from which the articles are prepared. The preparation of plastic articles by means of applying a dye composition to the surface of the plastic article is generally known and the carriers of the present invention can be applied to these types of articles in a similar manner.

As mentioned, the article preferably takes the form of a finished textile. For instance, the carriers of the invention may be applied to socks, knee sleeves, elbow sleeves, calf sleeves, core bands, ankle sleeves, back braces, shirts, tanks, jackets, shorts, pants, tights, hosiery, gloves, headbands, etc. Examples of such products are those sold by Tommie Copper under its COPPER ZNERGY® brand. Alternatively, the article may preferably take the form of a bolt of fabric, sheet, pillow case, blanket or other type of woven or knitted home good.

The invention is not meant to be limited by the final form of the article, its intended use or the composition of the substrate.

In one preferred embodiment of infused textile article of the present invention, the infused textile article is a sock. However, those of skill in the art will recognize that the textile article of the present inventions is not limited to socks. Rather the textile article may be any type of textile article, such as any number and style of footwear, pants, shirts, shorts, dresses, head coverings, gloves or undergarments for example. Even still, the present inventions are not limited to garments or apparel. For example, the present inventions may include sheets of textile, e.g. sheets used for use in cut-and-sew operations. Additionally, textile articles have a variety of other shapes or applications. For example, they may include tires or ropes, or structural components such as composite and honeycomb articles for building products ranging from airplane parts, bicycle frames, canoes and kayak to various electrical components or chips for electrical components.

Referring to garments, while the textile article is preferably knit for increased compression or comfort in some applications e.g., socks, there is no limitation to the type of construction that can be used in the present invention. By way of example, any number of woven, non-woven or composite construction techniques can also be used, which all would be within the scope of the present invention.

The substrate can further have a dye affixed to it. The dye may be a basic dye, cationic dye having a positive charge, or a reactive dye. For example, the dye may be Terasil Black, Terasil Blue, Terasil Red, Terasil Yellow, Erionyl Navy, Erionyl Yellow, and Erional Red (manufactured by Huntsman Chemicals), which products are zero discharge hazardous chemicals (ZDHC), Dorolan Black MSRL (M.Dohmen) and/or Ex Acid Blue. The article may include any combination of such dyes. Reactive dyes that may be employed include Remazol Black B 133%, Remazol Br Blue BB 133%, Remazol Br Blue RW, Remazol BR. Orange 3R, Remazol Br. Red 3BS 150%, Remazol Br. Yellow 3GL gran, Remazol Deep Black GWF, Remazol Deep Black N 150%, Remazol Luminous Yellow FL, Remazol Navy Blue RGB gran, Remazol Orange RGB, Remazol Red RB 133%, Remazol Turquoise G-A, and Remazol Yellow 3RS-A 150%, available from DyStar. A great many dyes are known for dyeing fabrics, particularly cellulosics, virtually any color in the spectrum. They are readily available from a number of commercial sources. Preferably, the dyes are acidic.

The polymer of the present invention may be applied using conventional methods used to dye an article, for instance a dye bath or pad frame for dyeing a fiber or woven substrate. Those skilled in the art will recognize that numerous dye baths or other dyeing machines could be used to achieve the present invention. For example, the dye bath may achieve dyeing through beam, beck, jet and jig processing.

The dye bath may include numerous components. For example, it may include a dye, such as an acidic dye, for example, some of the dyes and agents listed above. Preferably, the dye is present in an amount between about 0.1% and 20% OWG (on weight of goods), and more preferably, the dye is present in an amount between about 1% and 10% OWG.

The dye bath may include a salt, which is preferably a magnesium sulfate. Applicants prefer to use about 1 to about 2 weight % of salt for speed and ease of process; however, salt and acid are not required to practice the invention. Additional additives, e.g. various emulsifiers and surfactants may also be added to improve dyeing as are known in the art. In exemplary embodiments, such auxiliary agents include Invadine®, Albaflow® Albatex®, Invatex®, Univadine®, Albfluid®, and Ultraphil® products, all available from Huntsman Chemical; ®Rucogol, ®Ruco Acid, Hydrocol Six (Rudolf Group), acetic acid, sodium hexametaphosphate, caustic soda and various defoaming agents.

The dye bath may include a dye assistant. The dye assistant facilitates attachment of the dye to the substrate. The dye assistant may be present in any amount that allows dyeing.

The dye bath may include a pH adjuster, for adjusting the pH of the bath. Preferably, the pH adjuster is an organic acid, and may be, for example, citric acid, formic acid, acetic acid or mixtures thereof. Others may prefer other adjusters, such as other organic or inorganic acids, which are within the scope of the present invention.

For purposes of the present embodiment, applicants prefer the pH of the dye bath to be between about 3 and about 8, preferably below 7.5. In certain embodiments, a pH of 5.5-7.0, more preferably 6.0-7.0, is desired while in other embodiments, a pH around 5.0 is preferred. With regards to specific pH, however, that will depend on the polymeric carrier and dye used and on the desired color of the textile article.

When bath dyeing, while there is no real limitation to the order of steps needed to perform the present invention, applicants prefer to add the textile to the bath and the bath is brought to temperature. The dye and the salt are added in the desired amount and then adjust the pH to desired level. The polymeric carrier and any auxiliary agents are then added. For applicants' purposes, heating to temperatures between about 40° C. and 50° C. is ideal, and preferably between 43 to 49° C. Others however may wish to heat the bath to temperature and then add the textile, or adjust pH at some later step in the dyeing process. All such variations, including variations with the addition of polymer, dye, dye assistant and salt, are within the scope of the present invention.

The applied dye and finish may be exposed to heat and drying after application in order to cure the polymeric carrier and/or dry the article. One group of polyurethanes containing blocked polyisocyanates needs to be activated by heat to initiate curing, such running through a dryer or other system like a can. Pillow cases treated in a dye bath were ironed to fully cure the technology. Other one-component systems are cured with atmospheric moisture. The rate of curing is linked to the pot life, which is the time during which the polyurethane can be manipulated before cross-linking leads to increased viscosity and curing.

Textile articles produced in the dye bath of the present inventions exhibited depth of dyeing similar or greater to that of dyeing achieved with known carriers. Dyeing using the present inventions achieved full penetration. Additionally, lightfastness, which is typically low for basic dyes, is not further impaired by the present invention. Lightfastness was found to be roughly the same for textile articles dyed using the present inventions as for textile articles dyed using known dye assistants. Similarly, lightfastness was approximately the same internally and externally for articles of the present invention.

For some textile articles, the ability of a fiber substrate to accept a dye may be important for aesthetic reasons. For example, colors may improve the visibility of the article, which may be important for joggers running at dusk or in the dark. Similarly, colors may help distinguish the wearer of an article, which may be important for, for example, sports teams. Still, colors may be important for distinguishing articles having important characteristics. With regard to home goods, certain colors have been found to have a calming effect. It is therefore an advantage of the invention that all types of colors of metal-releasing articles can be achieved.

Moreover, rather than distinguish, colors may also be used to help articles blend in. The ability to blend in may be increasingly important in camouflage applications, for example, for camouflage shirts, vests and/or pants. Additionally, being able to provide such articles in new colors that were not previously available may increase salability. Also, being able to more efficiently produce metal-releasing dyed articles may decrease cost, which may allow more consumers to purchase such products.

Finished articles made in accordance with the invention include black, silver, slate grey, white, blue, pomegranate, pink, nude, navy, blackberry, olive, orchid, azure, green, coral, orange, red, yellow, plum, and brown fabrics and garments. The invention is not limited by color.

Articles to which the polymeric carrier composition is applied are not limited to dye bath procedures. The invention also comprises articles in which the polymeric carrier has been applied via a dip in finish bath/pad; spray application (vs. pad); foam application (vs. pad); scour/wash or bleach machine: in-bath (continuous or batch), tumbler or softening machine (continuous or batch), wet print, and 3d and sublimation print methods, including digital, the basic steps of which are well known to those in the art.

Filaments, fibers or yarns and fabrics to which the inventive metal-containing carrier has been applied may be subject to customary finishing processes, such as crimping, curling, twisting, sizing, softening, or lubricating to facilitate weaving, knitting and other textile operations.

Filaments, threads or yarns produced in accordance with the invention are useful in the preparation of various types of fabrics. However, they are especially useful in the preparation of compression garments, and the like. An advantage of the invention is that fabrics especially suitable for fabrication into apparel included woven, non-woven or knitted fabrics are not limited by weight, tensile modulus, tensile strength, elongation at break, moisture absorptivity or electric conductivity.

In addition to having a high molecular weight capable of providing the required mechanical characteristics, including modulus, tensile strength, elongation, etc., of a textile fiber, the metal-containing articles in accordance with the present invention are capable of providing fibers which satisfy the following additional requirements:

(a) moisture regain, i.e. ability to absorb moisture without degradation of textile properties;
(b) antistatic property, i.e. a surface resistance;
(c) resistance against laundering and dry cleaning, i.e. must withstand repeated laundering and/or dry cleaning cycles of up to 25 times or more, without loss in mechanical properties, fading, etc.;
(d) resistance against atmospheric influences, i.e. must withstand light, oxygen, ozone, acidic impurities, and the like without loss in mechanical properties, fading, etc.;
(e) soft hand, good tear strength; and
(f) repellant properties (water, wind, rain, snow, insect).

Fabrics containing 1 to 20% by weight of the carriers of the present invention satisfy all of the foregoing requirements while at the same time providing the requisite degree of comfortableness, abrasion-resistance and antistatic properties essential in articles of apparel, especially apparel, such as footwear, headwear and clothing, in particular, compression garments, home goods, such as sheets, bedding, blankets, and the like.

The invention will now be described in by the following non-limiting examples.

EXAMPLE 1

Preparation of Zinc and Copper Containing Polymer

In a small, stainless steel beaker, an ethanolamine solution was prepared from 13,500 moles of ammonia and 4,507 moles of ethylene oxide. The mixture was stirred for 30 minutes to ensure the reagents fully reacted. The amount of ammonia may be controlled by controlling the temperature of the mixture. Typically, one may heat the reaction mixture slowly at no higher than 70 F to have less ammonia, or cool it to have more ammonia. Monoethanolamine (MEA) was retrieved by a method known in the art and combined with water in a water phase, allowing the ammonia to stay liquefied under lower pressures.

Anhydrous copper sulfate was suspended in 80% deionized water and 0.02% of the ethanolamine solution producing a blue mixture. 0.07% of the suspended copper sulfate mixture was added to an aqueous dispersion of polymethyl methacrylate or polyhydroxypropylmethacrylate. 0.33% zinc pyrithione was added to the mixture to produce a nearly colorless solution.

The polymer of Example 1 was applied to fabric at 4% by weight. The fabric was dried.

EXAMPLE 2

Preparation of Zinc and Copper Containing Polymer

The reactions of example 1 were carried out under liquid nitrogen maintaining a temperature around 21° C.

EXAMPLE 3

Preparation of Zinc and Copper Containing Polymer

In a small, stainless steel beaker, an ethanolamine solution was prepared from 13,500 moles of ammonia and 4,507 moles of ethylene oxide. The mixture was stirred for 30 minutes to ensure the reagents fully reacted. Monoethanolamine (MEA) was retrieved by a method known in the art and combined with water in a water phase, allowing the ammonia to stay liquefied under lower pressures.

Anhydrous copper sulfate was suspended in 80% deionized water and 0.02% of the ethanolamine solution producing a blue mixture. 0.07% of the suspended copper sulfate mixture was added to an aqueous dispersion of polyurethane. 0.33% zinc pyrithione was added to the mixture to produce a nearly colorless solution.

The polymer was applied to fabric at 4% by weight. The fabric was dried.

EXAMPLE 4

Dye Bath Process

Socks (nylon/spandex) pretreated in a bath having a pH below 7.5 were cleaned with no chemical applied, bleached and scoured to remove residual oils and waxes. The socks were added to a dye bath in a low liquor ratio (10:1, water:fabric) finishing machine. The dyed socks were then processed with a finish having the following composition:

| Ingredient | Weight % |
|---|---|
| Polymer (Zn + Cu) | 5.0 |
| Softener | 3.0 |
| 56% acetic acid | 3.0 |
| 40% liquid concentrate magnesium sulfate or 10% solid magnesium sulfate | 25 |
| water | qs |

A water bath was heated to 37° C.; the acetic acid and magnesium sulfate were added. The mixture was stirred for 2 minutes and a polymer carrier suspension containing zinc and copper was added in increments with stirring. The mixture was heated to 46 to 48° C. Upon reaching the temperature, the heated mixture was circulated for 15 minutes until the bath cleared. The softener was added and the bath was stirred for another 8 minutes at 46° C. After the socks were dyed, the bath was drained and the finish was extracted from the socks by centripetal force. The material was boarded as needed.

EXAMPLE 5

Dye Bath Process

Crew shirts were prepared as in example 4 except that a higher ratio machine (e.g. 20:1, water:fabric) was used. The finish comprised 7% of a polymer carrier suspension containing zinc and copper, and sodium bicarbonate was used to set the bath pH at 4.0.

EXAMPLE 6

Framing Pad Process

A polyester/spandex 84/16 circular knit jersey pretreated in a bath having pH less than 7 was dried with only water in the finish pads. A finish having the following composition was prepared:

| Ingredient | Weight % |
| --- | --- |
| Polymer (Zn + Cu) | 5.0 |
| Compatibilizer | 1.5 |
| acetic acid/sodium bicarbonate | As needed |
| water | qs |

The polymer carrier suspension containing zinc and copper was mixed for a minimum of 2 hours until the suspension was consistent. A chemical tank was filled with 50% or less of the water needed and heated to 40° C. The compatibilizer was added to the tank in that order with mixing, and the pH was adjusted to 5.5-7.0 with acetic acid/sodium bicarbonate. The finish was filtered as it was added to an open width pad trough in tandem with a Tenter frame and recirculated once in the trough. The finish was applied to fabric at 85% wet pick up ensuring that frame temperature did not exceed 140° C.

EXAMPLE 7

Framing Pad Process

The framing pad process of example 6 was run on polyester/spandex 84/14 at 85% wet pick up with various dye compositions to produce nude, black, silver and silver heather garments.

EXAMPLE 8

Framing Pad Process

The framing pad process of example 6 was run on polyester/spandex 84/12 fabrics at 85% wet pick up with several dye compositions to produce silver and silver heather garments.

While specific examples are drawn to the application of reactive metals to fabrics or fibers for producing garments and fabric components having metal ions available for transport outside of the article, other obvious applications are also considered within the scope of this disclosure.

Articles that may have reactive metal ions or complexes bound to their surface may be fabrics, foams, molded products, footwear, finished garments, or other articles that have a surface capable of accepting the carrier or vehicle containing the reactive metal or metal complex.

What is claimed is:

1. A polymeric carrier composition for use in the manufacture of metal-infused fabric and garments comprising:
    a polymer consisting of polyurethane;
    copper (II) sulfate pentahydrate present at 50 to 70% by weight of the composition; and
    at least one water soluble zinc salt or coordination complex having an oxidation state of +1 or +2;
    wherein the composition is a suspension, wherein the polyurethane is synthesized from a polyol and an isocyanate compound, and wherein the zinc is reactive after combination with the polymer.

2. The polymeric composition of claim 1, comprising 0.5 to 10% by weight of the polymer.

3. The polymeric carrier composition of claim 1, wherein the composition comprises zinc pyrithione.

4. The polymeric carrier composition of claim 3, wherein the zinc pyrithione is present in the composition at 0.5 to 10% by weight of the suspension.

5. The polymeric carrier suspension of claim 1, further comprising an oxyalkylene poly amino ether.

6. The polymeric carrier composition of claim 1, wherein the polyol is selected from the group consisting of hydroxyl-terminated polybutadienes (HTPB), hydroxy-terminated polyethers (HTPE), hydroxy-terminated caprolactone ethers (HTCE), and a mixture of poly-1,4-butanediol and polyethylene glycol (TPEG); and wherein the isocyanate compound is selected from the group consisting of toluene diisocyante (TDI), diphenylmethane-4,4'-diisocyante (MDI), polymeric MDI, isophorone diisocyanate (IPDI), and hexamethylene diisocyanate (HDI).

7. The polymeric carrier composition of claim 1, wherein the polyurethane has a free NCO in the range of 3-25%.

8. A metal-infused article comprising:
    a substrate; and
    the polymeric carrier composition according to claim 1 applied to the substrate.

9. The metal-infused article of claim 8, wherein the substrate is a woven fabric.

10. The metal-infused article of claim 9, wherein the woven fabric is comprised of at least one of cotton, nylon, polyester, and spandex.

11. The metal-infused article of claim 8, wherein the polymeric carrier composition is applied to the substrate at 2 to 20% by weight.

12. A polymeric carrier suspension for use in the manufacture of metal-infused articles comprising:
    a polymer consisting of polyurethane present at 0.5 to 10% by weight of the suspension;
    copper (II) sulfate pentahydrate present at 50% to 70% by weight of the suspension; and
    at least one zinc compound having an oxidation state of +1 or +2, or a salt or coordination complex thereof;
    wherein the polyurethane is synthesized from a polyol and an isocyanate compound and the suspension has a viscosity less than 1,000 cps; and
    wherein the copper and the zinc are reactive after combination with the polymer.

13. The polymeric carrier suspension of claim 12, wherein the ratio of copper (II) sulfate pentahydrate to zinc salt is 2.45:3.

14. The polymeric carrier suspension of claim 12, wherein the zinc compound consists of zinc pyrithione or zinc-2-pyridinethiol-1-oxide.

* * * * *